UNITED STATES PATENT OFFICE.

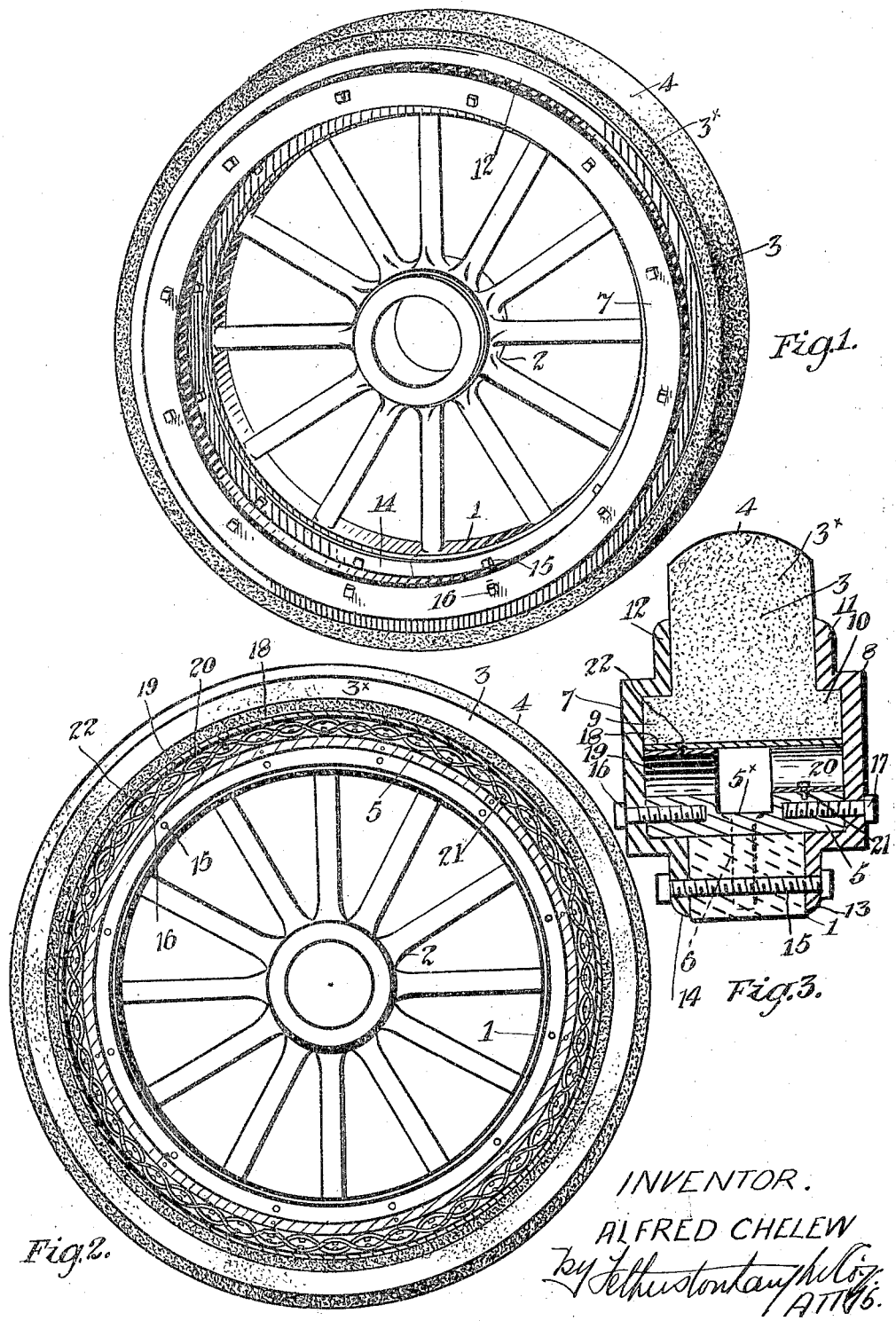

ALFRED CHELEW, OF TORONTO, ONTARIO, CANADA.

CUSHION-WHEEL.

1,234,289.  Specification of Letters Patent.  Patented July 24, 1917.

Application filed March 22, 1917. Serial No. 156,748.

*To all whom it may concern:*

Be it known that I, ALFRED CHELEW, of the city of Toronto, in the county of York, in the Province of Ontario, Canada, have invented certain new and useful Improvements in Cushion-Wheels, of which the following is the specification.

My invention relates to improvements in cushion wheels and the object of the invention is to devise a simple, light durable structure which will have a maximum resilience, which is particularly adaptable for use on a wheel for light trucks and which may be easily and readily adapted to fit and be secured to the felly of an automobile truck wheel and it consists essentially of the following arrangement and construction of parts as hereinafter more particularly explained.

Figure 1, is a general perspective view of my wheel.

Fig. 2, is a vertical face section taken immediately to one side of the cushion tread.

Fig. 3, is an enlarged cross sectional view through the felly, cushion tread and connecting structure.

In the drawings like letters of reference indicate corresponding parts in the various figures.

1 indicates the wooden felly of an automobile wheel 2. 3 indicates a cushion tread of rubber which is T-shape in cross section having the main arm of the T extending outwardly and crowned at the end at 4. 5 indicates a metal ring which extends around the felly 1 and which is provided with a central channel $5^x$, the ring 5 being secured to the felly by screws 6.

7 and 8 indicate opposing annular channel plates, the channels of such plates facing inwardly and into the radially outer portion of which the laterally extending arms 9 and 10 of the cushion 3 extends. 11 and 12 indicate annular flanges extending outwardly from the channel plates 7 and 8, the flanges 11 and 12 fitting against the outer faces of the arm $3^x$ of the cushion tread 3. 13 and 14 indicate annular flanges extending inwardly from the channel plates 7 and 8 so as to fit against the sides of the wooden felly 1.

15 indicates bolts extending through the flanges 13 and 14 and felly 1 thereby securing the channel plates 7 and 8 to the felly. 16 and 17 indicate screws extending through the channel plates into the metal ring 5. 18 indicates an endless annular band or hoop which fits against the inner face of the T-shape tread 3. 19 and 20 indicate spring bands which extend annularly around and between the metal ring 5 and hoop 18. The bands 19 and 20 are undulated, the undulations of one band being oppositely directed in relation to the undulations of the other band. By this means the bands alternately fit against the metal ring 5 and hoop 18. 21 indicates screws by which the metal bands 19 and 20 are secured to the ring 5. 22 indicates rivets by which the bands 19 and 20 are connected to the hoop 18.

It will thus be seen that a cushion wheel constructed as above described will have a maximum resilience, not only having the resilience of a cushion tread, but also the resilience of interposed undulated spring bands 19 and 20, which also serve to hold the tread in position so as to prevent any circumferential movement.

It will thus be seen that I have devised a very simple construction of cushion rim which may be readily secured to any ordinary form of wooden felly desired.

What I claim as my invention is:

A device of the class described comprising plates secured to each side of the felly, a tread carried between said plates, a metal ring secured to the plates having a centrally located peripheral channel, means in said channel securing the ring to the felly, a hoop fitting between the plates adjacent the tread and spaced from the ring, a resilient peripherally extending member supporting the hoop and tread from the ring located on each side of the channel, and means for securing the members to the ring and hoop.

ALFRED CHELEW.

Witnesses:
 M. EGAN,
 I. CARROLL.